(12) United States Patent
Nozaki

(10) Patent No.: US 8,284,857 B2
(45) Date of Patent: Oct. 9, 2012

(54) COMMUNICATION SYSTEM, TRANSMITTER AND RECEIVER

(75) Inventor: Masahiro Nozaki, Komae (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 763 days.

(21) Appl. No.: 12/404,432

(22) Filed: Mar. 16, 2009

(65) Prior Publication Data

US 2010/0226457 A1    Sep. 9, 2010

(30) Foreign Application Priority Data

Mar. 9, 2009  (JP) .................................. 2009-054396

(51) Int. Cl.
*H04L 27/00* (2006.01)
(52) U.S. Cl. .......... 375/295; 327/291; 332/106; 341/20; 341/173
(58) Field of Classification Search .................... 375/295
See application file for complete search history.

(56) References Cited

U.S. PATENT DOCUMENTS

| | | | | |
|---|---|---|---|---|
| 5,847,666 A | * | 12/1998 | Yasoshima et al. | 341/58 |
| 7,456,814 B2 | * | 11/2008 | Lee et al. | 345/96 |
| 7,549,011 B2 | * | 6/2009 | Moschopoulos | 711/103 |
| 2003/0046483 A1 | * | 3/2003 | Moschopoulos | 711/103 |
| 2005/0069043 A1 | * | 3/2005 | Kiehl | 375/259 |
| 2005/0289435 A1 | * | 12/2005 | Mulla et al. | 714/758 |
| 2006/0259716 A1 | * | 11/2006 | Moschopoulos | 711/156 |
| 2009/0213941 A1 | * | 8/2009 | Yin | 375/257 |
| 2010/0027486 A1 | * | 2/2010 | Gorokhov et al. | 370/329 |
| 2010/0080315 A1 | * | 4/2010 | Yano et al. | 375/267 |
| 2010/0080320 A1 | * | 4/2010 | Yano et al. | 375/295 |
| 2010/0172583 A1 | * | 7/2010 | Shimauchi et al. | 382/166 |

FOREIGN PATENT DOCUMENTS

| | | |
|---|---|---|
| EP | 0 811 945 A2 | 12/1997 |
| JP | 11-068720 | 3/1999 |
| JP | 2007-306212 | 11/2007 |
| WO | WO 2004/021634 | 3/2004 |

OTHER PUBLICATIONS

Austrian Search Report dated Feb. 8, 2010 for Singapore Appln. No. 200901804-5.
7 Electrical Characteristics, 8 Physical Transmission Layer; ETSI TS 102 613; V7.3.0; Sep. 2008; pp. 17-23.

\* cited by examiner

*Primary Examiner* — David Ometz
*Assistant Examiner* — Santiago Garcia
(74) *Attorney, Agent, or Firm* — Pillsbury Winthrop Shaw Pittman, LLP

(57) ABSTRACT

A communication system comprises a transmitter configured to binary data and a receiver configured to the data transmitted from the transmitter. The transmitter counts the number of bits of any one of binary value of a data section of the transmission data, and determines whether or not inversion processing should be performed in accordance with the counted number. When performing the inversion processing, the transmitter reverses each bit of the data section of the transmission data, adds inversion information showing that the bits have been reversed, and transmits the transmission data. The receiver receives the transmission data and determines whether or not inversion processing should be performed for the reception data, on the basis of the inversion information of the reception data. When performing the inversion processing, the receiver reverses each bit of the data section of the reception data.

2 Claims, 8 Drawing Sheets

Encoding system A

Encoding system B

Encoding system C

| Node address | Specification of encoding system | Command code | Data length | Data | Check code |

COMMUNICATION SYSTEM, TRANSMITTER AND RECEIVER

CROSS-REFERENCE TO RELATED APPLICATIONS

This application is based upon and claims the benefit of priority from prior Japanese Patent Application No. 2009-054396, filed Mar. 9, 2009, the entire contents of which are incorporated herein by reference.

BACKGROUND OF THE INVENTION

1. Field of the Invention

One embodiment of the invention relates to a communication system, a transmitter and a receiver which provide interactive communications via a communication path.

2. Description of the Related Art

In recent years, as an IC chip to be mounted on an IC card attains high performance, an IC card (portable electronic device) capable of executing a plurality of applications has been made practicable. Such an IC card executes various kinds of processing by obtaining a power supply from a dedicated reader/writer (electronic processing terminal).

When the IC card and reader/writer communicates with each other, a communication path is established. The portable electronic device is connected to one end of the communication path, and the electronic processing terminal is connected to the other end thereof. A technique, which transmits and receives binary data between the portable electronic device and the electronic processing terminal by switching a state (a high level) in which a large current is applied to the communication path and a state (a low level) in which no current is applied thereto in the connection state mentioned above, is disclosed in Jpn. Pat. Appln. KOKAI Publication No. 11-68720.

In the technique of the above, data is transmitted and received, for example, by replacing the data expressed in hexadecimal notation with a binary system. When the data is transmitted and received, a start bit and a stop bit is added to a data section which has been replaced with the binary system.

A transmission circuit of the transmitter applies a voltage to the communication path in response to the data expressed by the binary system. When transmitting a bit expressed by "1" in the binary system, the transmission circuit applies a voltage of the high level to the communication path. When transmitting a bit expressed by "0" in the binary system, the transmission circuit applies a voltage of the low level to the communication path. Thereby, the transmission circuit of the transmitter switches a state in which any current is applied to the communication path and a state in which any current is not applied thereto.

A reception circuit of the receiver measures a state flowing in the communication path to analyze the measurement result and then receives the data.

However, in the technique of the above, transmitting data with many bits which make current flows such as "FF" in hexadecimal notation, namely, "11111111" in the binary system poses a problem that large power is consumed.

BRIEF SUMMARY OF THE INVENTION

According to one embodiment of the invention, an object of the invention is to provide a communication system, a transmitter and a receiver which is configured to efficiently transmit and receive data.

According to an embodiment of the invention, there is provided a communication system with a transmitter configured to transmit binary data and a receiver configured to receive the data transmitted from the transmitter, wherein the transmitter comprises a count unit which counts the number of bits of any one of binary values of a data section of the transmission data to be transmitted; a first inversion determination unit which determines whether or not inversion processing should be performed for the transmission data on the basis of the number counted by means of the count unit: a first inversion processing unit which reverses each bit of the data section of the transmission data when the first inversion determination unit determines that the inversion processing should be performed; an inversion information processing unit which adds inversion information showing that the bits are reversed to the transmission data when the first inversion processing unit has reversed the bits; and a transmission unit which transmits the transmission data to the receiver, and the receiver comprises: a reception unit which receives the data transmitted from the transmitter; a second inversion determination unit which determines whether or not inversion processing should be performed for the transmission data on the basis of inversion information of the data received by means of the reception unit: and a second inversion processing unit which reverses each bit of the data section of the reception data when the second inversion determination unit determines that the inversion processing should be performed.

According to an embodiment of the invention, there is provided a transmitter configured to transmit data to a partner device through a communication path, comprising: a count unit which counts the number of bits of any one of binary values of a data section of the transmission data to be transmitted; an inversion determination unit which determines whether or not inversion processing should be performed for the transmission data on the basis of the number counted by means of the count unit: an inversion processing unit which reverses each bit of the data section of the transmission data when the inversion determination unit determines that the inversion processing should be performed; an inversion information processing unit which adds inversion information showing that the bits are reversed when the bits have been reversed by means of the inversion processing unit; and a transmission unit which transmits the transmission through the communication path.

According to an embodiment of the invention, there is provided a receiver configured to receive data transmitted from a partner device through a communication path, comprising: a reception unit which receives the data transmitted from the partner device through the communication path; an inversion determination unit which determines whether or not inversion processing should be performed for the reception data on the basis of inversion information of the data received by means of the reception unit; and an inversion processing unit which reverses each bit of a data section of the reception data when the inversion determination unit determines that the inversion processing should be performed.

According to an embodiment of the invention, there is provided a communication system with a transmitter configured to transmit binary data and a receiver configured to receive data transmitted from the transmitter, wherein the transmitter comprises: a first storage unit which stores a plurality of encoding systems therein in advance; a count unit which sections a data section of the transmission data to be transmitted and counts the data section for each pattern of the sectioned bits; a first selection unit which selects any one of the plurality of encoding systems stored in the first storage unit, on the basis of the number counted by means of the count unit; an encoding unit which encodes the data section of the transmission data on the basis of the encoding system selected by means of the first selection unit; an encoding information processing unit which adds encoding system specification information showing the encoding system selected by means of the first selection unit to the transmission data; and a transmission unit which transmits the transmission data to the receiver, and the receiver comprises: a second storage unit which stores a plurality of encoding systems therein in advance; a reception unit which receives the data transmitted from the transmitter; a second selection unit which selects any one of the plurality of encoding systems stored in the second storage unit, based on the encoding system specification information of the data received by means of the receiver; and a decoding processing unit which decodes the data section of the reception data on the basis of the encoding system selected by means of the second selection unit.

According to an embodiment of the invention, there is provided a transmitter configured to transmit data to a partner device through a communication path, comprising: a storage unit which stores a plurality of encoding systems therein in advance; a count unit which sections a data section of transmission data to be transmitted for each prescribed bit to count the data section of the sectioned bits for each pattern; a selection unit which selects any one of the plurality of encoding systems stored in the storage unit, on the basis of the number counted by means of the count unit; an encoding unit which encodes the data section of the transmission data on the basis of the encoding system selected by means of the selection unit; an encoding information processing unit which adds encoding system specification information showing the encoding system selected by means of the selection unit to the transmission data; and a transmission unit which transmits the transmission data through the communication path.

According to an embodiment of the invention there is provided a receiver configured to receive data transmitted from a partner device through a communication path, comprising: a storage unit which stores a plurality of encoding systems therein in advance; a reception unit which receives the data transmitted from the transmitter; a selection unit which selects any one of the plurality of encoding systems stored in the storage unit, on the basis of encoding system specification information of the data received by means of the reception unit; and a decoding processing unit which decodes the data section of the reception data on the basis of the encoding system selected by means of the selection unit.

According to an embodiment of the invention, a communication system, a transmitter and a receiver which area configured to efficiently transmit and receive data can be provided.

Additional objects and advantages of the embodiments will be set forth in the description which follows, and in part will be obvious from the description, or may be learned by practice of the invention. The objects and advantages of the invention may be realized and obtained by means of the instrumentalities and combinations particularly pointed out hereinafter.

DETAILED DESCRIPTION OF THE INVENTION

Hereinafter, a communication system, a transmitter and a receiver regarding a first embodiment of the invention will be explained in detail with reference to the drawings.

Figure 1:
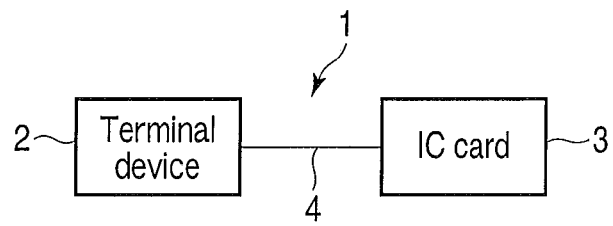
FIG. 1 is an exemplary view schematically depicting an example of a configuration of a communication system, a transmitter and a receiver regarding a first embodiment of the invention.
Figure 2:
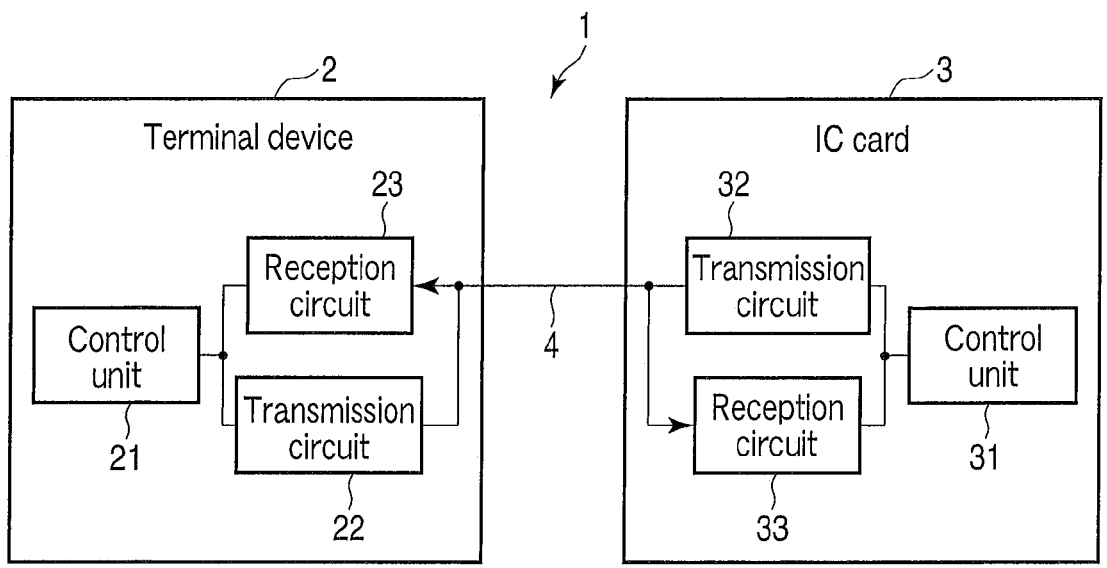
FIG. 2 is an exemplary a block diagram depicting the example of the configuration of the communication system, transmitter and receiver shown in FIG. 1.
Figure 3:
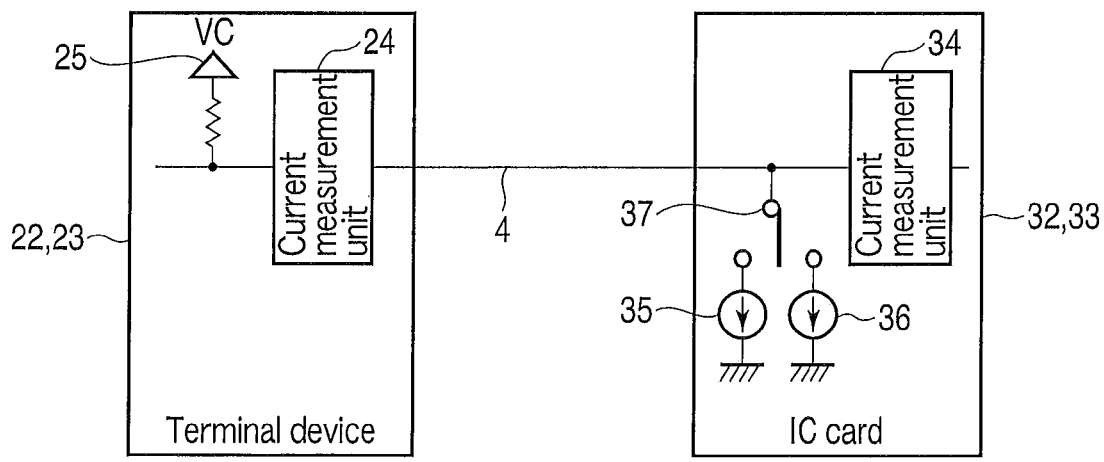
FIG. 3 is an exemplary explanation view for explaining the example of the configuration of the communication system, transmitter and receiver shown in FIG. 1.

FIGS. 1-3 show views schematically depicting examples of configurations of the communication systems, transmitters and receivers regarding the first embodiment of the invention.

A communication system 1 includes an electronic processing terminal (terminal device) 2, a portable electronic device (IC card) 3 and a communication path 4. The terminal device 2 and the IC card 3 are connected to each other through a communication path 4. The terminal device 2 and the IC card 3 interactively communicate with each other. In this case, the terminal device 2 functions as a transmitter and a receiver. The IC cards also functions as the transmitter and the receiver.

The terminal device 2 internally pulls up the communication path 4. The terminal device 2 includes a function of measuring a current flowing through the communication path 4.

The IC card 3 includes a function of internally short-circuiting the communication path 4 to a constant current source near "0" V at arbitrary timing. The IC card 3 short-circuits the communication 4 to the constant current source of the near "0" V then receives a current applied from the terminal device 2 through the communication path 4.

The IC card 3 switches the constant current source to be connected to the communication path 4 between a constant current source of near "0" V and a constant current source at a high level then transmits the data to the terminal device 2.

The terminal device 2 determines logic "1" and logic "0" by measuring the current flowing through the communication path 4 to receive data.

Here, it is defined that a state in which the current flows through the communication path 4 is the logic "1", and a state in which the current does not flow therethrough is the logic "0". That is, a bit of the logic "1" consumes larger power for transmission than a case of a bit of the logic "0".

As shown in FIG. 2, the terminal device 2 is comprised of a control unit 21, a transmission circuit 22 and a reception circuit 23. As shown in FIG. 3, the transmission circuit 22 and the reception circuit 23 of the terminal device 2 are comprised of a current measurement unit 24 and a power source 25.

The control unit 21 comprehensively controls operations of the transmission circuit 22 and the reception circuit 23. The control unit 21 has a memory configured to function as a storage means. The memory is composed, for example, a ROM, a RAM and a non-volatile memory. The ROM stores a program for controlling, data for controlling, etc., in advance. The RAM functions as a working memory so as to temporarily store data, etc., during processing through the control unit 21. The non-volatile memory stores the processing result from the terminal device 2.

The current measurement unit 24 measures the current flowing through the communication path 4. When determining that the current has been flowing through the communication path 4, the control unit 21 receives bit data of logic "0".

The reception circuit 23 and the control unit 21 of the terminal device 2 measure the current flowing through the communication path 4, and then receives the data to be transmitted (transmission data) from the IC card 3 connected to the other end of the communication path 4. That is, the reception circuit 23 functions as a reception unit.

The power source 25 applies a voltage to the communication path 4. Applying the voltage to the communication path 4 makes a current flow through the communication path 4.

The transmission circuit 22 of the terminal device 2 functions as a transmission unit. The transmission circuit 22 applies a voltage to the communication path 4 on the basis of the data to be input from the control unit 21. When a voltage with a high level (high voltage) is applied from the transmission circuit 22, the communication path 4 is brought into a state in which the current flows. When a voltage of a low level (low voltage) is applied from the transmission circuit 22, the communication path 4 is brought into a state in which the current does not flow.

The transmission circuit 22 applies the voltage of the high level to the communication path 4 in order to transmit bit data of logic "1". The transmission circuit 22 applies the low-level voltage to the communication path 4 in order to transmit bit data of logic "0".

That is, the transmission circuit 22 and the control unit 21 of the terminal device 2 switches between the state flowing the current through the communication path 4 and the state not flowing the current therethrough. Thereby, the transmission circuit 22 and the control unit 21 transmits the data to the IC card 3 connected to the other end of the communication path 4.

As shown in FIG. 2, the IC card 3 includes a control unit 31, a transmission circuit 32, and a reception circuit 33. As shown in FIG. 3, the transmission circuit 32 and the reception circuit 33 of the IC card 3 include a current measurement unit 34, a constant current source 35, and a constant current source 36.

The control unit 31 comprehensively controls operations of the transmission circuit 32 and the reception circuit 33. The control unit 31 includes a memory to function as a storage means. The memory is composed of, for example, a ROM, a RAM and a non-volatile memory. The ROM stores the program for control, the control data, etc., in advance. The RAM functions as a working memory to temporarily store data during processing through the control unit 31. The non-volatile memory stores the processing result of the terminal device 2.

The measurement unit 34 measures the current flowing through the communication path 4. When it is determined that the current has been flowing through the communication path 4, the control unit 31 receives the bit data of logic "1". When it is determines that the current has not been flowing therethrough, the control unit 31 receives the bit data of logic "0".

In other words, the reception circuit 33 and the control unit 31 of the IC card 3 measures the current flowing through the current path 4 in order to receive the data transmitted from the terminal device 2 connected to the other end of the communication path 4. Thus, the reception circuit 33 functions as a reception unit.

The constant current source 35 is a constant current source of near "0" V (low level). The constant current source 36 is a constant current source of a high level higher than the constant current source 35.

The transmission circuit 32 of the IC card 3 functions as a transmission unit. The transmission circuit 32 controls the switch 37 on the basis of the data input from the control unit 31 then switches the constant current source to be connected to the communication path 4 between the constant current source 35 and the constant current source 36.

When the constant current source 35 is connected to the communication path 4, the path 4 is brought into a state in which the current does not flow. When the constant current source 36 is connected to the communication path 4, the path 4 is brought into a state in which the current flows.

When transmitting the bit data of logic "1", the transmission circuit 32 controls the switch 37 to connect the constant power source 36 to the communication path 4. When transmitting the bit data of logic "0", the transmission circuit 32 controls the switch 37 to connect the constant power source 35 to the communication path 4.

The transmission circuit 32 and the control unit 31 of the IC card 3 switches between the state to flow the current to the communication path 4 and the state not to flow the current in accordance with the data to be transmitted. Thereby, the transmission circuit 32 and the control unit 31 transmit the data to the terminal device 2 connected to the other end of the communication path 4.

Figure 4:
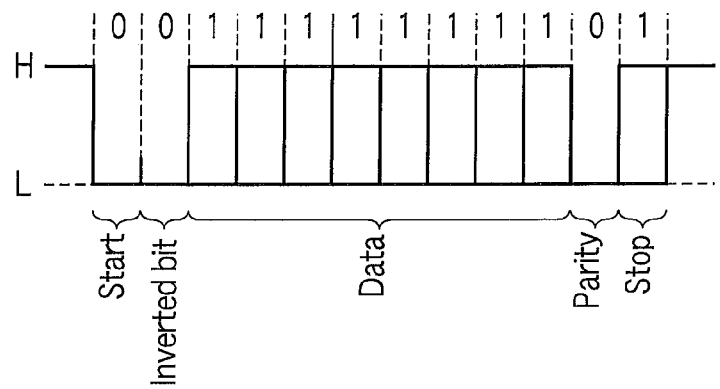
FIG. 4 is an exemplary explanation view for explaining a configuration example of data transmitted through a communication path.

FIG. 4 shows an explanation view for explaining a configuration example of the data to be transmitted through the communication path 4 in the first embodiment.

The transmission data is data of which the minimum unit is a bit. Data of 1 frame (1 byte) is composed of a plurality of bits. The terminal device 2 and the IC card 3 transmit and receive the data for each frame.

As shown in FIG. 4, the data of the 1 frame consists of a start bit (Start), an inverted bit, a plurality of data bits (Data), a parity bit (Parity), and a stop bit (Stop).

The start bit is a bit to be added in front of the data to be transmitted. The start bit is 1 bit and the data of logic "0". When the data has not been transmitted, the communication path 4 is maintained in a mark state, namely, a state of logic "1". When receiving the data of logic "0", the terminal 2 and the IC card 3 determines that they have received the start bit. Thereby, the terminal device 2 and the IC card 3 detect the start of the transmission of the data.

The inverted bit is a bit for determining whether or not a data section composed of a plurality of data bits is an inverted data bit. The inversion of the data section will be mentioned below.

The data bit (data section) is a bit for expressing the data to be transmitted. For instance, the data bit is composed of 8 bits or 7 bits.

The parity bit is a bit for use in error detection. Any one of odd number parity and even number parity is set in advance to the terminal device 2 and the IC card 3.

When the odd parity is set in the terminal device 2 and the IC card 3, a device on a transmission side switches between logic "0" and logic "1" of the parity bit so as to the number of logic "1" in the data always becomes an odd number.

When the even parity is set to the terminal device 2 and the IC card 3, the device on the transmission side switches between logic "0" and logic "1" of the parity bit so as to the number of logic "1" in the data always becomes an even number.

A device on a reception side counts the number of logic "1" of the reception data to detect any error during transmission. When the odd parity is set, and if the number of logic "1" of the reception data is an even number, the device on the reception side detects any error. When the even parity is set, and if the number of logic "1" of the reception data is an odd number, the device on the reception side detects any error.

The stop bit is a bit to be added to the end of the data to be transmitted. The stop bit is 1 to 2 bits, and the data of logic "1". The terminal device 2 and the IC card 3 can detect the end of the data of the 1 frame by means of the stop bit.

If the successive data does not exist, the communication path 4 is maintained again in a mark state, namely, in the state of logic "1".

Figure 5:
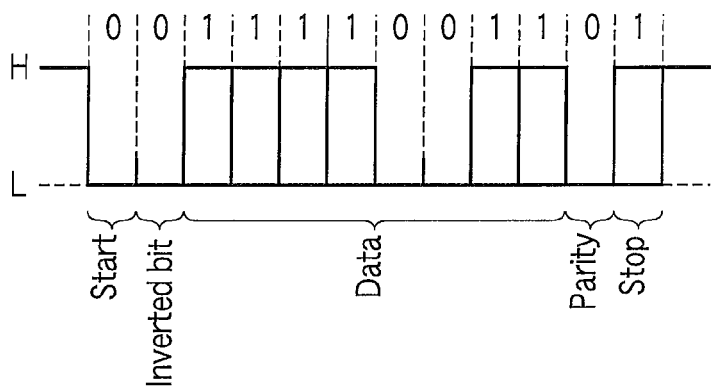
FIG. 5 is an exemplary explanation view for explaining an example of data to be transmitted through a communication path.

FIG. 5 shows an explanation for explaining an example of the data to be transmitted through the communication path 4. It is assumed that this transmission data is transmitted in a least significant bit (LSB) first system.

The following will describe an assumed example in which the data is transmitted from the IC card 3 to the terminal device 2. However, when the terminal device 2 transmits the data to the IC card 3, the invention may be also applicable in a similar processing.

As shown in FIG. 5, in the transmission data, the reversed bit is logic "0", and the data section is composed of "11110011". Namely, the transmission data shown in FIG. 5 is data of "CF" in the hexadecimal system.

The control unit 31 temporarily stores the transmission data in a transmission buffer (buffer memory). The control unit 31 checks bits composing of the data section of the transmission data. The control unit 31 counts the number of bits that are logic "1" of the data section. In this case, the control unit 31 functions as a count unit.

The control unit 31 determines whether or not the counted number exceeds a half of the number of bits in the data section. For instance, if the data section is composed of 8 bits, the control unit 31 determines whether or not the number of bits of logic "1" is five or more. For instance, if the number of bits of logic "1" is seven in the data section, it is determined whether or not the number of bits of logic "1" is four or more. Thereby, the control unit 31 determines whether or not the inversion processing should be performed. In this case, the control unit 31 functions as a first inversion determination unit.

If the control unit 31 determines that the number of bits of logic "1" exceeds a half of the number of bits of the data section, the control unit 31 adds inversion information to the data. That is, the control unit 31 puts logic "1" at the inverted bit. In this case the control unit 31 functions as a first inversion information processing unit.

The control unit 31 performs inversion processing so as to reverse each bit of the data section. If the data section is equivalent to "11110011", the control unit 31 replaces the data section with "00001100". Thereby, the data shown in FIG. 5 is converted into data shown in FIG. 6. In this case, the control unit 31 functions as an inversion processing unit. The control unit 31 transmits the data shown in FIG. 6 to the terminal device 2 by means of the transmission circuit 32.

If the control unit 31 determines that the number of bits of logic "1" does not exceed the half of the number of the bits at the data section, the control unit 31 puts "0" at an inverted bit. The control unit 31 transmits the data shown in FIG. 6 to the terminal device 2 by means of the transmission circuit 32.

When determining that the number of bits of logic "1" does not exceed the half of the number of the bits in the data section, the control unit 31 puts "0" at the inverted bit. The control unit 31 transmits the data shown in FIG. 5 to the terminal device 2 by means of the transmission circuit 32.

Each of functions of the aforementioned count unit, first inversion determination unit, first inversion information processing unit and inversion processing unit is also provided for the terminal device 2.

Figure 6:
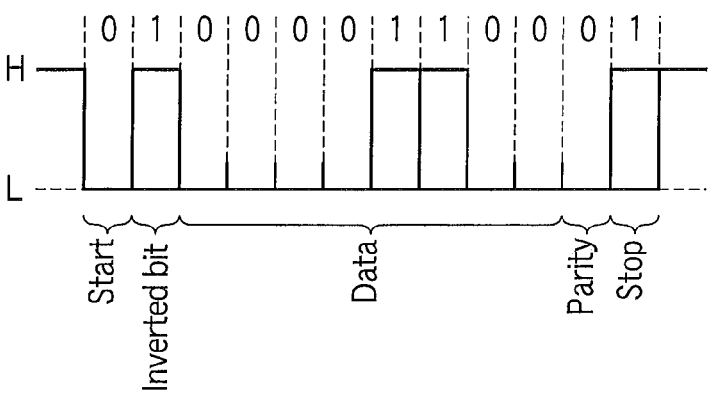
FIG. 6 is an exemplary explanation view for explaining an example of converted data.

FIG. 6 shows an explanation view for explaining an example of converted data.

As shown in FIG. 6, in the transmission data, the inverted bit is logic "1" and the data section is expressed by "00001100".

When receiving the data, the control unit 21 of the terminal device 2 confirms if the inverted bit is logic "1" or logic "0". Thereby, the control unit 21 determines whether or not the inversion processing should be applied to the data section of the reception data. Namely, the control unit 21 functions as a second inversion determination unit.

If the inverted bit is logic "1", the control unit 21 recognizes that the successive data section is composed of inverted bits. Namely, the control unit 21 reads each bit by applying inversion processing for inverting each bit when reading the data.

If the inverted bit is logic "0", the control unit 21 recognizes that the successive data section is composed of not inverted bits. Namely, the control unit 21 reads each bit without inversing each bit for reading the data.

For instance, when receiving the data shown in FIG. 6, the control unit 21 confirms that the inverted bit is logic "1", and recognized that the successive data section is composed of inverted bits. The control unit 21 reverses each bit of "00001100" of the data section to replace the data section with "11110011". The control unit 21 recognized that the data section is "CF" from "11110011" expressed in binary notation.

For instance, when receiving the data shown in FIG. 5, the control unit 21 confirms that the inverted bit is logic "0", and recognizes that the successive data section is composed of not inverted bits. The control unit 21 reads each bit of "11110011" of the data section to recognize that the data section is "CF".

The data shown in FIG. 5 includes 6 bits of bits consuming large power, namely bits of logic "1", in the data section. Meanwhile, the data shown in FIG. 6 includes 2 bits of the logic "1" in the data section, and includes 1 bit in the inverted bit. As given above, inverting each bit in response to the states of bits of the data section enables suppressing consumed power for transmitting the data.

Each of the functions of the second inversion determination unit and the second inversion processing unit is also provided for the IC card.

Figure 7:
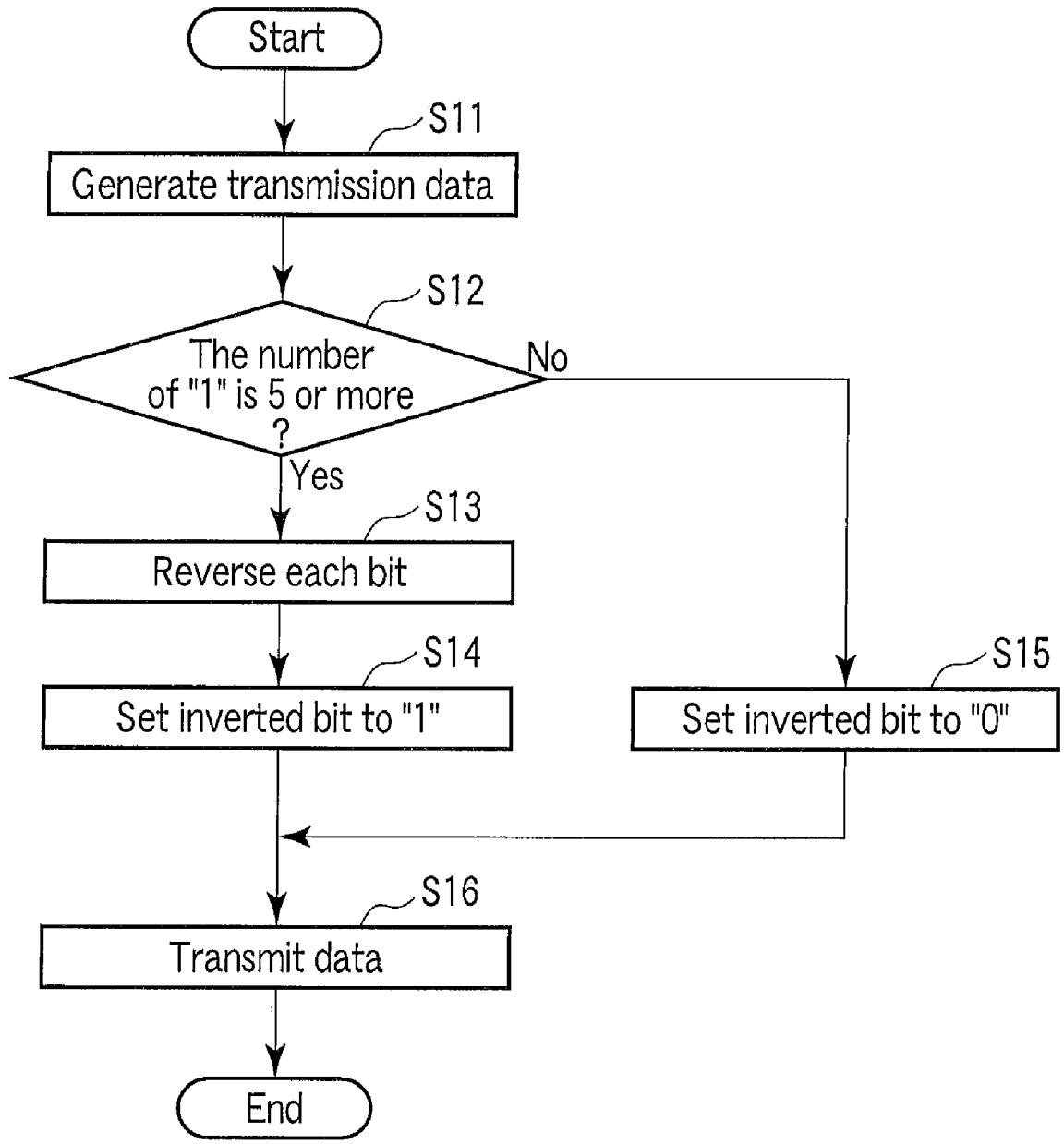
FIG. 7 is an exemplary flowchart for explaining processing when an IC card transmits data to a terminal device.

FIG. 7 shows a flowchart for explaining the processing for transmitting the data from the IC card 3 to the terminal device 2. While the flowchart will be described by assuming an example in which the IC card 3 transmits the data to the terminal device 2, the invention can be applied to the case of transmission of the data from the terminal device 2 to the IC card 3 in the same processing as that of the forgoing example. Here, an example in which the data section is composed of 8 bits will be described.

The control unit 31 generates the transmission data (Step S11). For instance, the control unit 31 stores the processing result of the processing which has been performed in the IC card 3 in a transmission buffer as the transmission data.

The control unit 31 determines whether or not the number of the bits of logic "1" is 5 or more (Step S12). The control unit 31 checks the bits composing of the data section of the transmission data and counts the number of the bits of logic "1". The control unit 31 determines whether or not the counted number exceeds five bits that is the half or more of the number of the bits in the data section, When it is determined that the number of the bits of logic "1" is five or more (YES, Step S12), the control unit 31 reverses each bit of the data section (Step S13). For instance, as shown FIGS. 5-6, if the data section is composed as "11110011", the control unit 31 replaces the data section with "00001100". The control unit 31 puts logic "1" at the inverted bit (Step S14).

If it is determined that the number of the bits of the logic "1" does not exist 5 or more (No, Step S12), the control unit 31 puts logic "0" at the inverted bit (Step S15).

The control unit 31 transmits the data stored in the transmission buffer to the terminal device 2 by means of the transmission circuit 32 (Step S16).

Figure 8:
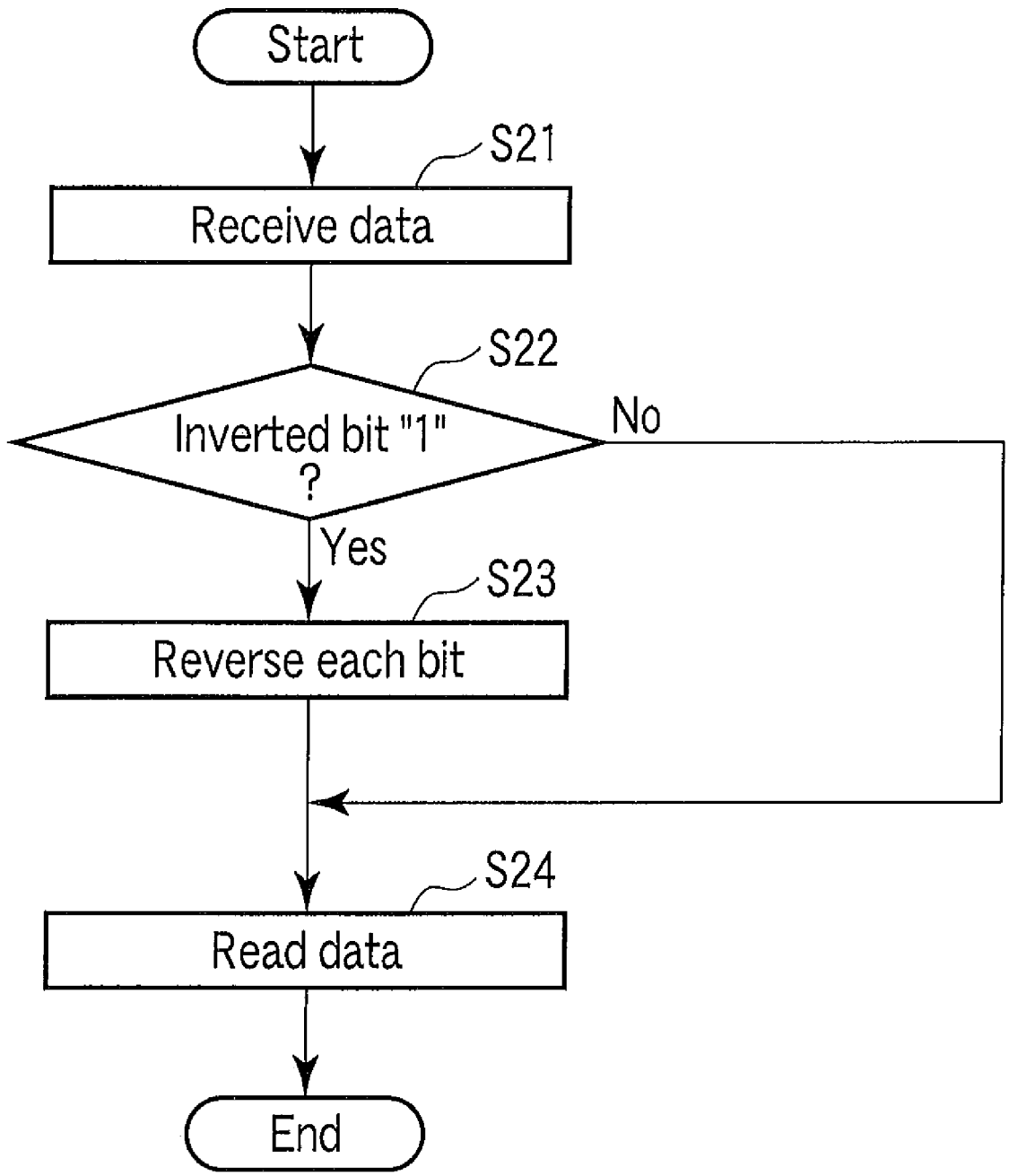
FIG. 8 is an exemplary flowchart for explaining processing when the terminal device receives the data transmitted from the IC card.

FIG. 8 shows a flowchart for explaining the processing for receiving the data to be transmitted from the IC card 3 by means of the terminal device 2.

The control unit 21 of the terminal device 2 receives the data from the reception circuit 23 (Step S21). For instance, the control unit 21 stores the reception data in a reception buffer.

When the data has been received, the control unit 21 of the terminal device 2 determines whether or not the inverted bit is logic "1" (Step S22). If the inverted bit is logic "1", the control unit 21 recognizes that the successive data section is composed of the inverted bits. If the inverted bit is logic "0", the control unit 21 recognizes that the bits of the successive data section have not been inverted.

If the control unit 21 determines that the inverted bit is logic "1" (YES, Step S22), the control unit 21 inverts each bit of the data section (Step S23). For instance, as shown in FIG. 6, if the data section is composed of "00001100", the control unit 31 replaces the data section with the composition of "11110011".

The control unit 31 reads the data stored in the reception buffer (Step S24), and recognizes the reception data.

As described above, when the number of the bits of logic "1" of the data section of the transmission data exceeds more than half the number of the bits of the data section, the device on the transmission side reverse each bit of the data section. The device on the transmission side puts logic "1" for the inverted bit so as to indicate that the bit has been inverted.

The device on the reception side checks whether the inverted bit is logic "1" or logic "0". If the inverted bit is logic "1", the device on the reception side inverts to read each bit of the data section. Thereby, the number of bits which consume large power may be reduced.

As a result, a communication system, a transmitter and a receiver configured to efficiently transmit and receive data may be provided.

While the aforementioned embodiment has been described the configuration which inverts each bit of the data section for each data of one byte (eight bits), the invention is not limited to the configuration. For instance, any length can become a section as long as a length of which minimum unit is the one byte as each of the data section is inverted for each data of one block (256 bits).

While the foregoing embodiment has been described the configuration which adds the inverted bits as the information showing the inversion of each bit of the data section, the invention is not limited to the configuration. For instance, the number of the stop bits can be used as the information showing the inversion of each bit of the data section.

Figure 9:
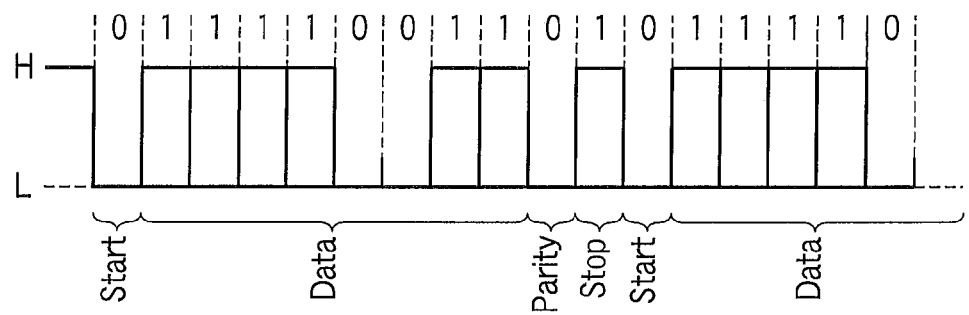
FIG. 9 is an exemplary explanation view for explaining a configuration example of data to be transmitted through a communication path in another example of the first embodiment.
Figure 10:
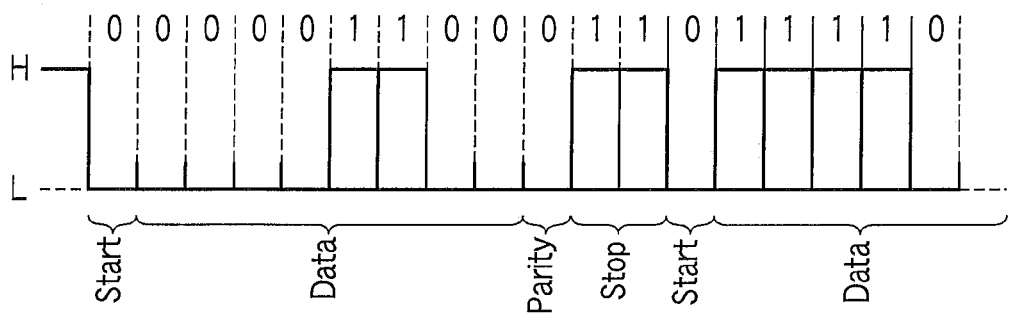
FIG. 10 is an exemplary explanation view for explaining a configuration example of data to be transmitted through a communication path in a further example of the first embodiment.

FIGS. 9-10 each show explanation views for explaining the configuration examples of the data to be transmitted through the communication path 4 in another example of the first embodiment.

FIG. 9 shows an explanation view for explaining an example of the data to be transmitted through the communication path.

As shown in FIG. 9, the data of one frame consists of a start bit (Start), a plurality of data bits (Data bit), a parity bit (Parity), and a stop bit (Stop).

The start bit is a bit to be added in front of the data to be transmitted (transmission data). The start bit is 1 bit, and data of logic "0". The terminal device 2 and the IC card 3 detect the start of the transmission of the data by means of the start bit.

The data bit (data section) is a bit for expressing the transmission data. For instance, the data section is 8 bits or 7 bits.

The parity bit is a bit for use in error detection.

The stop bit is a bit to be added to the end of the transmission data. The stop bit is 1 bit or 2 bits, and the data of logic "1". The terminal data 2 and the IC card 3 can detect the end of the data of 1-frame by means of the stop bit.

IF the successive data exists, and if the start bit is detected next, the terminal device 2 and the IC card 3 recognizes that the detected bit is the head of the next data.

A case in which the device on the transmission side is the IC card 3 will be described by way of example. Even a case in which the terminal device 2 is the device on the transmission side, the invention can be applied in the same manner as that of the example which will be described below.

The control unit 31 temporarily stores the transmission data in the transmission buffer (buffer memory). The control unit 31 checks bits composing of the data section of the transmission data. The control unit 31 counts the number of the bits that are logic "1" of the data section.

The control unit 31 determines whether or not the number of bits of the data section exceeds a half of the number of the bits in the data section. For instance, if the data bit is composed of 8 bits, the control unit 31 determines whether or not the number of bits of logic "1" is five or more. If the data section is composed of 7 bits, the control unit 31 determines whether or not the number of the bits in the data section is four or more.

If it is determined that the number of the bits of logic "1" exceeds the half number of the number of bits in the data section, the control unit 31 puts two bits of the stop bits. That is, the control unit 31 sets the number of the bits of logic "1" in the later section of the parity bit to two bits. Thereby, when transmitting the data successively, the start bit of the next data will be transmitted behind the stop bit of the two bits.

The control unit 31 reverses each bit of the data section. Namely, if the data section is composed of "11110011", the control unit 31 replaces the data section with "00001100". Thereby, the data shown in FIG. 9 is converted into data shown in FIG. 10. The control unit 31 transmits the data shown in FIG. 10 to the terminal device 2 by means of the transmission circuit 32.

FIG. 10 shows an explanation view for explaining an example of the converted data.

As shown in FIG. 10, in the transmission data, the data section is expressed by "00001100", and its stop bit is composed of two bits.

When receiving the data, the control unit 21 of the terminal device 2 confirms if the number of the stop bit is 1 bit or 2 bits.

If the number of the stop bit is 2 bits, the control unit 21 recognizes that the bits of the successive data section are inverted bits. That is, for reading the data, the control unit 21 reverses each bit to read the each bit.

If the number of the stop bit is 1 bit, the control unit 21 recognizes that the bits of the successive data section are not inverted bits. That is, for reading the data, the control unit 21 reads each bit without reversing each bit.

For instance, when the data shown in FIG. 10 has been received, the control unit 21 confirms that the number of the stop bit is two bits, and recognizes that the successive data section is composed of inverted bits. The control unit 21 reverses each bit of "00001100" of the data section to replace each bit of the data section with "11110011". The control unit 21 recognizes that the data section is "CF" from "11110011" expressed in the binary system.

As given above, the device on the transmission side decides the number of the stop bit in response to the ratio of the bits of the logic "1" of the data section of the transmission data. The device on the transmission side reverses each bit of the data section to transmit the data section through the communication path 4.

The device on the reception side checks if the number of the stop bit is one or tow. If the number of the stop bits is two, the device on the reception side reverses each bit of the data section to read it. Thereby, the number of bits consuming large power can be reduced.

As a result, a communication system, a transmitter and a receiver configured to efficiently transmit and receive data can be provided.

A second embodiment will be described hereinafter.

Figure 11:
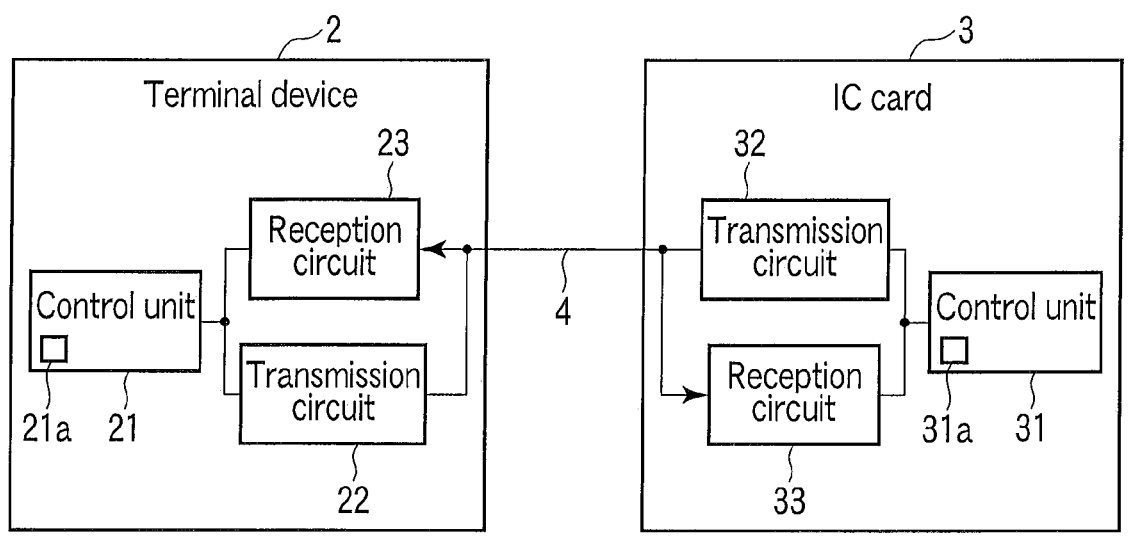
FIG. 11 is an exemplary block diagram depicting an example of a configuration of a communication system, a transmitter and a receiver regarding a second embodiment of the invention.

FIG. 11 shows a block diagram depicting an example of a configuration of a communication system, a transmitter and a receiver regarding the second embodiment of the invention. The same components as those of the first embodiment are designated by the identical reference symbols and the detail explanation will be omitted.

The second embodiment will be described by assuming that the IUC card 3 transmits the data to the terminal device 2. However, also when the terminal device 2 transmits the data to the IC card 3, the invention may be applied in the same processing as that of the second embodiment.

The data to be transmitted between the terminal 2 and the IC card 3 is applicable to any one of patterns of "00", "11", "01" and "10" when the data is sectioned for each 2 bits.

It is assumed that a state in which a current flows through the communication path 4 is "H(high)", and a state in which a current does not flow through the communication path 4 is "L(low)". Usually, when transmitting a bit of logic "00", the IC card 3 controls so that the value of the current flowing through the communication path 4 continues "L" by two bits. In other words, the IC card 3 controls so that the value of the current flowing through the communication path 4 becomes "LL".

When transmitting a bit of logic "11", the IC card 3 controls so that the value of the current flowing becomes "HH". When transmitting a bit of logic "01", the IC card 3 controls so that the value of the current flowing through the communication path 4 becomes "LH". When transmitting a bit of logic "10", the IC card 3 controls so that the value of the current flowing through the communication path 4 becomes "HL".

Then, the control unit 31 of the IC card 3 sections the bits consisting of the data section for each 2 bits, and encodes the data section so as to assign the value of the current "LL" to the patterns having the largest number.

As shown in FIG. 11, the control unit 21 of the terminal device 2 includes an encoding table 21a. The control unit 31 of the IC card 3 includes an encoding table 31a.

The encoding tables 21a, 31a are storage unit which store a plurality of combinations for encoding the data section of the transmission data. The control unit 31 of the IC card 3 sections the bits composed of the data section for each 2 bits, and counts each number of the patterns of logic "00", "11", "01" and "10". Namely, the control unit 31 functions as a count unit which counts the number for each pattern of the sectioned bits.

The control unit 31 selects one of a plurality of encoding systems stored in the encoding table 31a, on the basis of the counted number. Then, the control unit 31 functions as a first selection unit.

The control unit 31 encodes the data stored in the transfer buffer in the selected encoding system.

Figure 12:
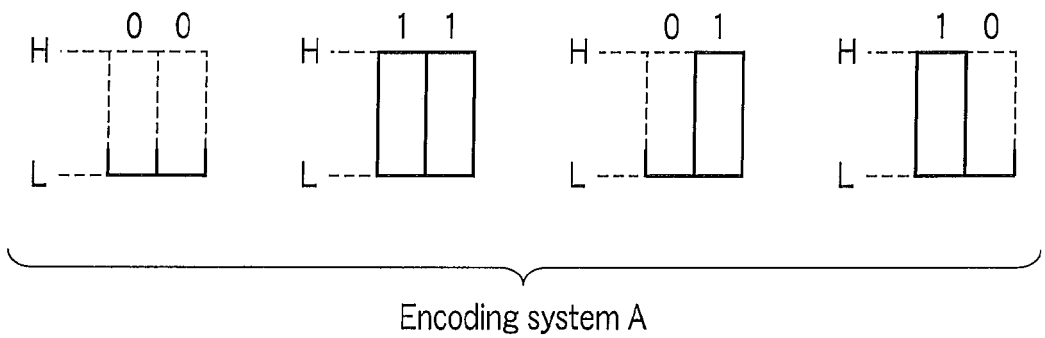
FIG. 12 is an exemplary explanation view for explaining an example of a combination of encoding stored in an encoding table.
Figure 13:
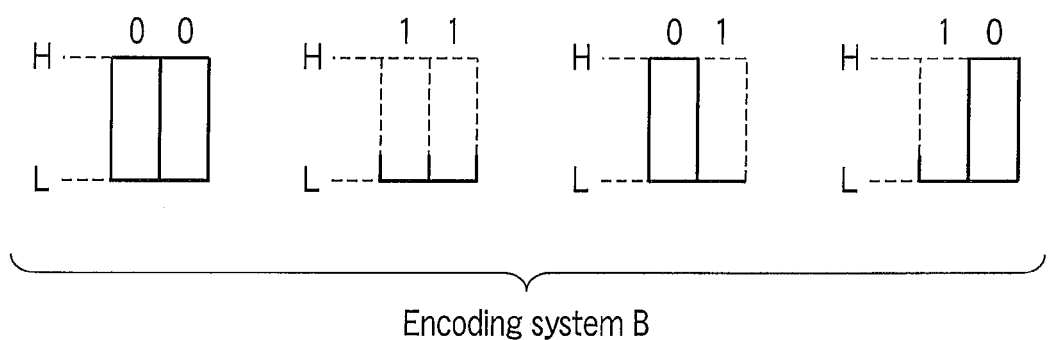
FIG. 13 is another exemplary explanation view for explaining an example of a combination of encoding stored in an encoding table.
Figure 14:
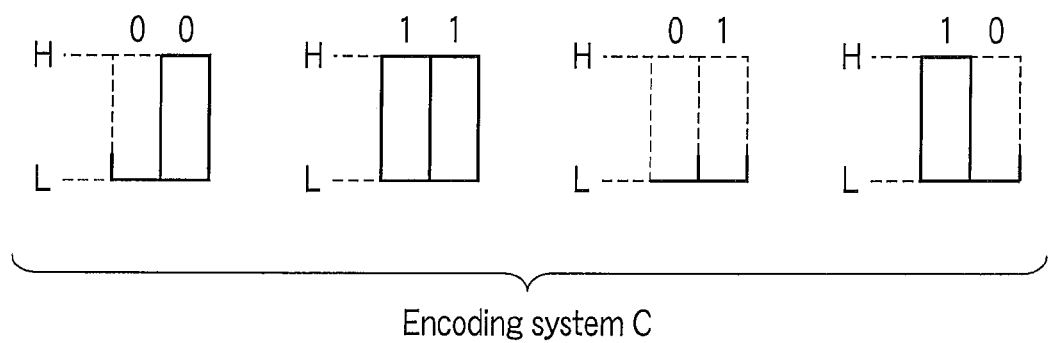
FIG. 14 is further exemplary explanation view for explaining an example of a combination of encoding stored in an encoding table.

FIGS. 12-14 show explanation views for explaining examples of the combinations of the encoding stored in the encoding tables 21a, 31a.

FIG. 12 shows an explanation view for explaining an encoding system A. The encoding system A is selected when the patterns "00" exist mostly at the bits in the transmission data.

As shown in FIG. 12, when transmitting the bits of logic "00" by using the encoding system A, the IC card 3 controls so that the value of the current flowing through the communication path 4 becomes "LL". When transmitting the bits of logic "11" by using the encoding system A, the IC card 3 controls so that the value of the current flowing through the communication path 4 becomes "HH". When transmitting the bits of logic "01" by using the encoding system A, the IC card 3 controls so that the value of the current flowing the communication path 4 becomes "LH". When transmitting the bits of logic "10" by using the encoding system A, the IC car 3 controls so that the value of the current flowing through the communication path 4 becomes "HL".

FIG. 13 shows an explanation view for explaining an encoding system B. The encoding system B is selected when the patterns of "11" exist mostly in the bits of the transmission data.

As shown in FIG. 13, when transmitting the bits of logic "00" by using the encoding system B, the IC card 3 controls so that the value of the current flowing through the communication path 4 becomes "HH". When transmitting the bits of logic "11" by using the encoding system B, the IC card 3 controls so that the value of the current flowing through the communication path 4 becomes "LL". When transmitting the bits of logic "01" by using the encoding system B, the IC card 3 controls so that the value of the current flowing through the communication path 4 becomes "HL". When transmitting the bits of logic "10" by using the encoding system B, the IC card 3 controls so that the value of the current flowing the communication path 4 becomes "LH".

FIG. 14 shows an explanation view for explaining an encoding system C. The encoding system C is selected when the patterns of "01" exist mostly in the bits of the transmission data.

As shown in FIG. 14, when transmitting the bits of logic "00" by using the encoding system C, the IC card 3 controls so that the value of the current flowing through the communication path 4 becomes "LH". When transmitting the bits of logic "11" by using the encoding system C, the IC card 3 controls the value of the current flowing through the communication path 4 becomes "HH". When transmitting the bits of logic "01" by using the encoding system C, the IC card 3 controls so that the value of the current flowing through the communication path 4 becomes "LL". When transmitting the bits of logic "10" by using the encoding system C, the IC card 3 controls so that the value of the current flowing through the communication path 4 becomes "HL".

The combinations of the encoding are not limited to the aforementioned encoding systems A, B, C. The encoding tables further store other combinations. An acceptable configuration may be configured so that the control unit 31 sections the bits consisting of the data section for each 2 bits, assigns the value of the current "LL" to the patterns of which the number is the largest, assigns "LH" and "HL" to the patterns of which the numbers are the second largest and the third largest, respectively, and assigns "HH" to the patterns of which the number is the fourth largest.

Figures 15, 16:
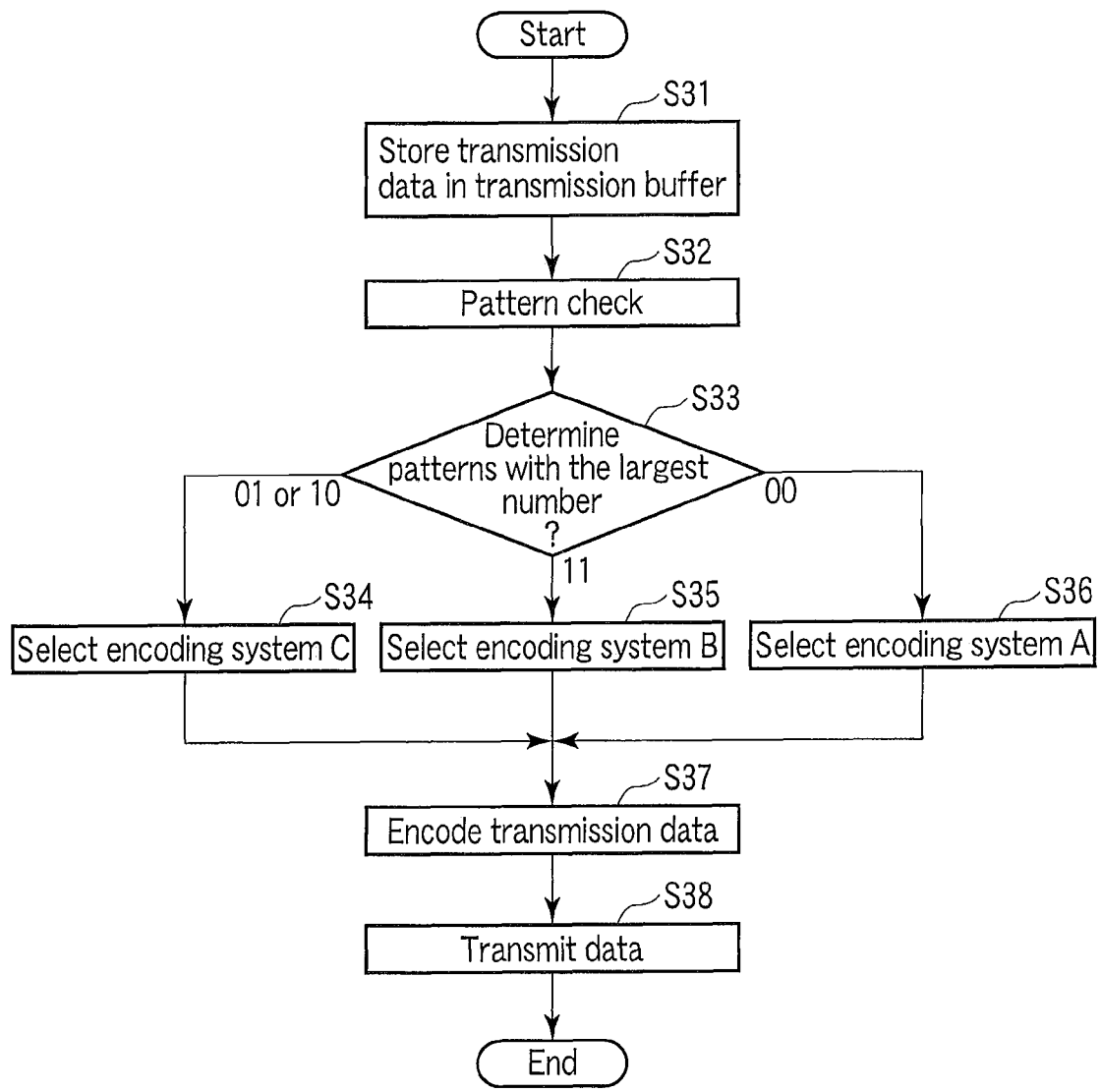
FIG. 15 is an exemplary view for explaining a format of the data transmitted from the IC card to the terminal device.
FIG. 16 is an exemplary flowchart for explaining processing when the IC card transmits the data to the terminal device.

FIG. 15 shows an explanation view for explaining a format of data to be transmitted from the IC card 3 to the terminal device 2.

As shown in FIG. 15, the transmission data includes "node address", "encoding system specification information", "command code", "data length", "data" and "check code".

The "node address" is information showing a transmission destination address and a transmission source address. The "command code" is information for specifying processing of data. The "data length" is information showing the length of the "data" section. The "data" means data to be transmitted (transmission data). The "check code" is information for confirming the validity of the transmission data.

The "encoding system specification information" is information showing the encoding system used for encoding the "data" section. Namely, when encoding the "data" section, the control unit 31 adds the information showing the selected encoding system as the "encoding system specification information". In this case, the control unit 31 functions as an encoding information processing unit.

When receiving the data, the control unit 21 of the terminal device 2 confirms the "encoding system specification information". Namely, the control unit 21 determines that which of the encoding systems A, B, C is shown by the encoding system specification information. Based on the determination, the control unit 21 selects one of the plurality of encoding systems stored in the encoding table 21a. In this case, the control unit 21 functions as the second selection unit.

In accordance with the selected encoding system, the control unit 21 decodes the reception data. Thus, the control unit 21 functions as a decoding processing unit.

If the encoding system specification information is the information showing the encoding system A, the control unit 21 interprets that the value of the current "LL" by 2-bit is logic "00". The control unit 21 interprets that the value of the current "HH" by 2 bits is logic "11". The control unit 21 interprets that the value of the current "LH" by 2 bits is logic "01". Further, the control unit 21 interprets that the value of the current "HL" by 2 bits is logic "10".

If the encoding system specification information is the information showing the encoding system B, the control unit 21 interprets that the value of the current "LL" by 2 bits is logic "11". The control unit 21 interprets that the value of the current "HH" by 2 bits is logic "00". The control unit 21 interprets that the value of the current "LH" by 2 bits is logic "10". Further, the control unit 21 interprets that the value of the current "HL" by 2 bits is logic "01".

When the encoding system specification information is the information showing the encoding system C, the control unit 21 interprets that the value of the current "LL" by 2 bits is logic "01". The control unit 21 interprets that the value of the current "HH" by 2 bits is logic "11". The control unit 21 interprets that the value of the current "LH" by 2 bits is logic "00". Further, the control unit 21 interprets that the value of the current "HL" by 2 bits is logic "10".

According to the method given above, for example, a case in which the data of "79" is transmitted will be described. "79" expressed in hexadecimal notation is "01111001" in the binary system. When transmitting this data, if the data is sectioned for each 2 bits, the data becomes "01", "11", "10" and "01".

According to the second embodiment, the control unit 31 determines that the "01" is the patterns which exist mostly. Based on this determination, the control unit 31 selects the encoding system C among the plurality of encoding systems stored in the encoding table 31a.

The control unit 31 encodes the data of "01111001" through the encoding system C then obtains the data of "00111000". The control unit 31 adds the information showing the encoding system C as the "encoding system specification information", and transmits the data of "00111000" by means of the transmission circuit 32.

The control unit 21 of the terminal device 2 confirms the "encoding system specification information" to recognize it as the information showing the encoding system C. The control unit 21 selects the encoding system C stored in the encoding table 21a to interpret the reception data of "00111000".

That is, the control unit 21 sections the data of "00111000" for each 2 bits to interpret the data through the encoding system C. Thereby, the control unit 21 obtains the data of "01111001". The control unit 21 recognizes the data of "79" from the data of "11110011".

FIG. 16 shows a flowchart for explaining processing for transmitting the data from the IC card 3 to the terminal 2. While the flowchart will be described by assuming an example in which the terminal IC card 3 transmits the data to the terminal device 2, the invention may be applied to the case of transmission of the data from the terminal device 2 to the IC card 3 in the same processing as that of the foregoing example.

The control unit 31 generates the transmission data (Step S31). For instance, the control unit 31 stores the processing result of the processing which has been performed in the IC card 3 in the transmission buffer, as the transmission data.

The control unit 31 checks a line of bits in the bits of the data section (Step S32). The control unit 31 checks the bits composing of the data section of the transmission data for each 2 bits and counts the number of the patterns of logic "00", "11", "01" and "10", respectively. The control unit 31 determines the pattern which exists mostly on the basis of the counted number (Step S33).

In Step S33, if it is determined that the pattern of "01" or "10" exists mostly at the bits in the transmission data, the control unit 31 selects the encoding system C (Step S34).

In Step S33, if it is determined that the pattern of "11" exists mostly at the bits in the transmission data, the control unit 31 selects the encoding system B (Step S35).

In Step S33, if it is determined that the pattern of "00" exists mostly at the bits in the transmission data, the control unit 31 selects the encoding system A (Step S36).

The control unit 31 encodes the transmission data on the basis of the selected encoding system (Step S37). The control unit replaces the transmission data stored in the transmission buffer on the basis of the elected encoding system. The control unit 31 adds the information showing the selected encoding system (encoding system) to the transmission data.

The control unit 31 transmits the transmission data stored in the transmission buffer to the terminal device 2 by means of the transmission circuit 32 (Step S38).

Figure 17:
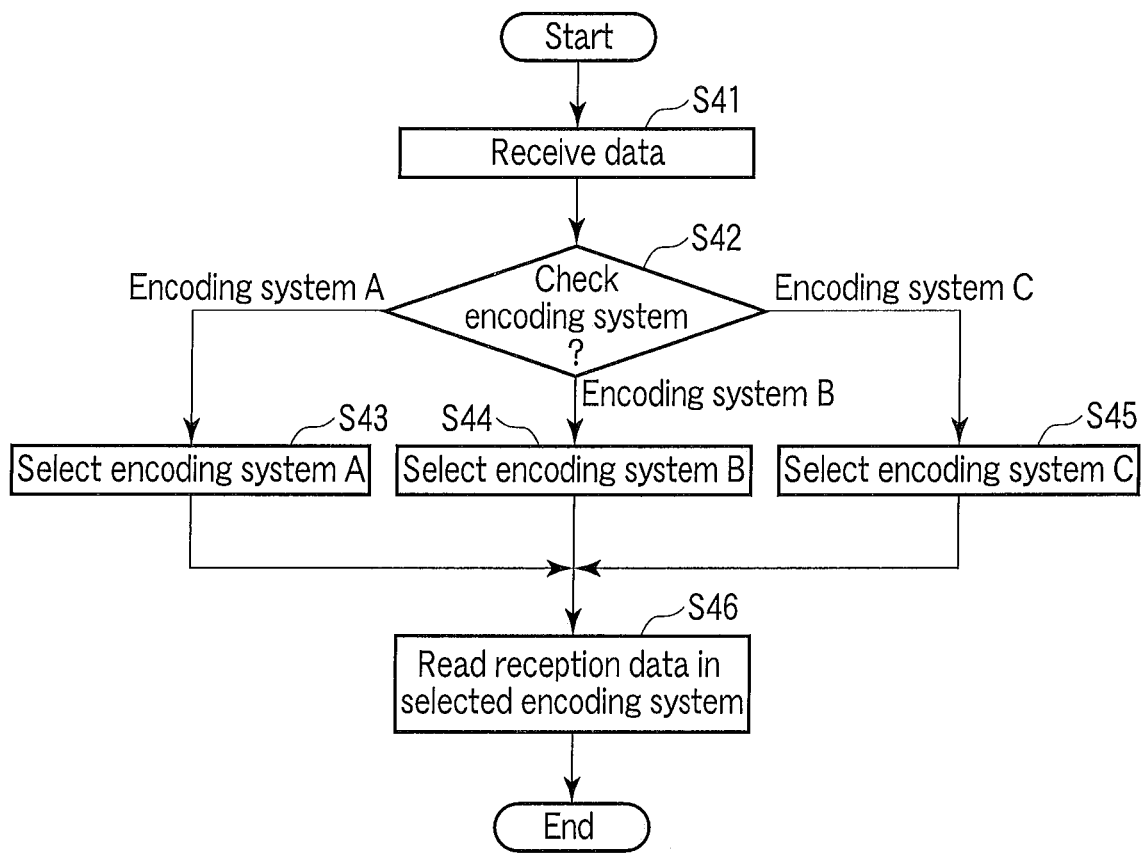
FIG. 17 is an exemplary flowchart for explaining processing when the terminal device receives the data transmitted from the IC card.

FIG. 17 shows a flowchart for explaining processing for receiving the data to be transmitted from the IC card 3 by means of the terminal device 2.

The control unit 21 of the terminal device 2 receives the data by means of the reception circuit 23 (Step S41). For instance, the control unit 21 stores the reception data in the reception buffer.

When the data is received, the control unit 21 of the terminal device 2 confirms "encoding system specification information" (Step S42). The control unit 21 determines that which of the encoding systems A, B, C is shown by the encoding system specification information. The control unit 21 selects one of the plurality of encoding systems stored in the encoding table 21a, on the basis of the determination, and interprets the reception data.

In Step S42, if the encoding system specification information of the reception data is the information showing the encoding system A, the control unit 21 selects the encoding system A (Step S43).

In Step S42, if the encoding system specification information of the reception data is the information showing the encoding system B, the control unit 21 selects the encoding system B (Step S44).

In Step S42, if the encoding system specification information of the reception data is the information showing the encoding system C, the control unit 21 selects the encoding system C (Step S45).

The control unit 21 reads the reception data on the basis of the selected encoding method (Step S46). The control unit 21 replaces the reception data stored in the reception buffer, on the basis of the selected encoding system. Thereby, the control unit 21 can obtain original data of the data encoded by the IC card 3.

As described above, the device on the transmission side sections the data of the transmission data for each 2 bits, and counts the number of patterns of logic "00" "11", "01" and "10", respectively. The device on the transmission side selects the encoding system on the basis of the counted number and replaces the bits through the selected encoding system.

The device on the reception side checks the encoding system specification information. The device on the reception side reads the reception data on the basis of the encoding system shown by the encoding system specification information. Thereby, for example, even if the number of logic "0" and the number of logic "1" are almost equal to each other, the number of bits consuming large power may be reduced.

As a result, a communication system, a transmitter, and a receiver configured to efficiently transmit and receive the data can be provided.

While the second embodiment of the above has been described in a case in which the number of each pattern is counted by sectioning for each 2 bits, and the bits are replaced with the bits with smaller power consumption, the invention is not limited to the configuration of the above. The number of sections of the bits in the data section may be any number. However, increasing the number of sections increases the number of patterns.

While the first and the second embodiments given above have been described in the examples of transmitting the data on the basis of the least significant bit (LSB), the invention is applicable to a case in which the data is transmitted on the basis of the most significant bit (MSB).

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A communication system with a transmitter configured to transmit binary data and a receiver configured to receive data transmitted from the transmitter, wherein the transmitter comprises:
a first storage unit which stores a plurality of encoding systems therein in advance;
a count unit which sections a data section of the transmission data to be transmitted and counts each number of the patterns of logic;
a first selection unit which selects any one of the plurality of encoding systems stored in the first storage unit, on the basis of the number counted by means of the count unit;
an encoding unit which encodes the data section of the transmission data on the basis of the encoding system selected by means of the first selection unit;
an encoding information processing unit which adds encoding system specification information showing the encoding system selected by means of the first selection unit to the transmission data; and
a transmission unit which transmits the transmission data to the receiver, and the receiver comprises:
a second storage unit which stores a plurality of encoding systems therein in advance;
a reception unit which receives the data transmitted from the transmitter;
a second selection unit which selects any one of the plurality of encoding systems stored in the second storage unit, based on the encoding system specification information of the data received by means of the receiver; and
a decoding processing unit which decodes the data section of the reception data on the basis of the encoding system selected by means of the second selection unit,
wherein the first selection unit selects the encoding system so as to replace patterns which exist mostly with patterns that minimize power consumption.

2. A transmitter configured to transmit data to a partner device through a communication path, comprising:
- a storage unit which stores a plurality of encoding systems therein in advance;
- a count unit which sections a data section of transmission data to be transmitted for each prescribed bit to count the data section of the sectioned bits for each pattern;
- a selection unit which selects any one of the plurality of encoding systems stored in the storage unit, on the basis of the number counted by means of the count unit;
- an encoding unit which encodes the data section of the transmission data on the basis of the encoding system selected by means of the selection unit;
- an encoding information processing unit which adds encoding system specification information showing the encoding system selected by means of the selection unit to the transmission data; and
- a transmission unit which transmits the transmission data through the communication path, wherein the selection unit selects the encoding system so as to replace patterns which exist mostly with patterns that minimize power consumption.

* * * * *